United States Patent
Hsu

(10) Patent No.: US 10,183,413 B2
(45) Date of Patent: Jan. 22, 2019

(54) MEASUREMENT STRUCTURE ADAPTED FOR CURTAIN CUTTING MACHINE

(71) Applicant: Sheen World Technology Corporation, Taichung (TW)

(72) Inventor: Hao-Yu Hsu, New Taipei (TW)

(73) Assignee: Sheen World Technology Corporation, Taichung (TW)

( * ) Notice: Subject to any disclaimer, the term of this patent is extended or adjusted under 35 U.S.C. 154(b) by 286 days.

(21) Appl. No.: 14/935,555

(22) Filed: Nov. 9, 2015

(65) Prior Publication Data
US 2017/0129121 A1     May 11, 2017

(51) Int. Cl.
| | | |
|---|---|---|
| *B26D 7/02* | (2006.01) | |
| *B23D 23/00* | (2006.01) | |
| *B26D 7/28* | (2006.01) | |
| *B26D 1/08* | (2006.01) | |
| *D06H 7/00* | (2006.01) | |
| *B23D 33/02* | (2006.01) | |

(52) U.S. Cl.
CPC ............... *B26D 7/28* (2013.01); *B26D 1/085* (2013.01); *B26D 7/02* (2013.01); *D06H 7/00* (2013.01); *B23D 33/02* (2013.01); *B23D 2023/005* (2013.01); *Y10T 83/654* (2015.04); *Y10T 83/76* (2015.04); *Y10T 83/872* (2015.04)

(58) Field of Classification Search
CPC .. B23D 2023/005; B23D 23/00; B23D 25/02; B23D 33/02; B23D 33/10; Y10T 83/872; Y10T 83/606; Y10T 83/613; Y10T 83/619; Y10T 83/654; Y10T 83/6612; Y10T 83/6579; Y10T 83/7734; Y10T 83/76; B26D 7/02; B26D 7/28; B26D 7/06

USPC ... 83/466.1, 422, 416, 412, 468, 468.1, 544, 83/397–398, 147, 860, 435.14, 83/522.15–522.21, 409
See application file for complete search history.

(56) References Cited

U.S. PATENT DOCUMENTS

| | | | | |
|---|---|---|---|---|
| 5,823,084 A | * | 10/1998 | Ramey | .................... B27B 29/00 269/228 |
| 7,665,393 B2 | * | 2/2010 | O'Banion | .............. B27G 19/02 144/251.1 |
| 8,312,799 B2 | * | 11/2012 | Frolov | .................... B27B 27/02 144/287 |
| 2009/0293692 A1 | * | 12/2009 | Gass | ...................... B23D 47/02 83/477.1 |

* cited by examiner

*Primary Examiner* — Laura M Lee
(74) *Attorney, Agent, or Firm* — Alan D. Kamrath; Kamrath IP Lawfirm, P.A.

(57) ABSTRACT

A measurement structure is adapted for a curtain cutting machine, and the curtain cutting machine contains: a track, a slidable seat, a scale set, a cutting device, and a covering cover. The track includes a front segment and a rear segment, and the slidable seat is disposed on and slides along the track and includes a clamping apparatus. The scale set is secured on the track to indicate a position of the slidable seat, the cutting device is located adjacent to the front segment of the track and includes an opening, and the covering door is mounted between the cutting device and the track and moves between a first position and a second position. When the covering door slides to the first position, it stops the opening of the cutting device, and when the covering door slides to the second position, it opens the opening of the cutting device.

8 Claims, 13 Drawing Sheets

MEASUREMENT STRUCTURE ADAPTED FOR CURTAIN CUTTING MACHINE

BACKGROUND OF THE INVENTION

Field of the Invention

The present invention relates to a cutting structure and, more particularly, to a measurement structure which is adapted for a curtain cutting machine by which an extending length of a curtain is controlled to cut the curtain.

Description of the Prior Art

A curtain is applied to shield a window and to decorate a house/room, and it is produced in various sizes and is cut by a curtain cutting machine based on using requirements.

Referring to FIGS. 12 and 13, a conventional curtain cutting machine contains a working table 10 on which a clamping apparatus 20, a cutting device 30, and a measuring device 40 are arranged. The cutting device 30 is disposed on and contacts with an outer surface of the clamping apparatus 20. The measuring device 40 is mounted on an outer surface of the cutting device 30 and includes a movable stop member 401 and a scale set 402 fixed on one side thereof. When cutting a curtain, the movable stop member 401 of the measuring device 40 is adjusted toward a desired cutting position relative to the scale set 402, one end of the curtain 50 extends through the clamping apparatus 20 to contact with the movable stop member 401 of the measuring device 40, and the clamping apparatus 20 clamps the curtain 50 so that the curtain 50 is cut by the cutting device 30, thus changing a width of the curtain 50.

However, when the one end of the curtain 50 contacts with the movable stop member 401 of the measuring device 40 and the clamping apparatus 20 clamps the curtain 50, the curtain 50 is interfered, and cut scraps get stuck between the cutting device 30 and the movable stop member 401 of the measuring device 40, so the cut scraps have to be removed manually or by using a tool. Furthermore, the measuring device 40 is mounted on the outer surface of the cutting device 30, so the conventional curtain cutting machine is too large to be fixed in a limited space.

The present invention has arisen to mitigate and/or obviate the afore-described disadvantages.

SUMMARY OF THE INVENTION

The primary objective of the present invention is to provide a measurement structure in which a covering door stops an opening of a cutting device, a scale set is configured to indicate a position of a slidable seat, and the slidable seat drives a curtain to extend out of the opening in a predetermined length, so the curtain is not interfered by the curtain cutting machine and is cut easily and quickly.

Another objective of the present invention is to provide a measurement structure in which the covering door stops the opening, the slidable seat slides along the track, and the scale set measures a movement of the slidable seat, so a size of the curtain cutting machine is small, thus fixing the curtain cutting machine in a limited space and using the curtain cutting machine conveniently.

To obtain above-mentioned objectives, a measurement structure provided by the present invention is adapted for a curtain cutting machine and contains: a track, a slidable seat, a scale set, a cutting device, and a covering cover.

The track includes a front segment and a rear segment.

The slidable seat is disposed on and slides along the track, and the slidable seat includes a clamping apparatus.

The scale set is secured on the track to indicate a position of the slidable seat.

The cutting device is located adjacent to the front segment of the track and includes an opening.

The covering door is mounted between the cutting device and the track and moves between a first position and a second position. When the covering door slides to the first position, it stops the opening of the cutting device, and when the covering door slides to the second position, it opens the opening of the cutting device.

Preferably, a curtain is placed on the track and its one end is biased against the covering door. Thus, the slidable seat slides along the track and indicates its position by way of the scale set, the clamping apparatus clamps the curtain, the covering door is moved and the slidable seat drives the curtain to extend out of the opening of the cutting device in a predetermined length to cut the curtain.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
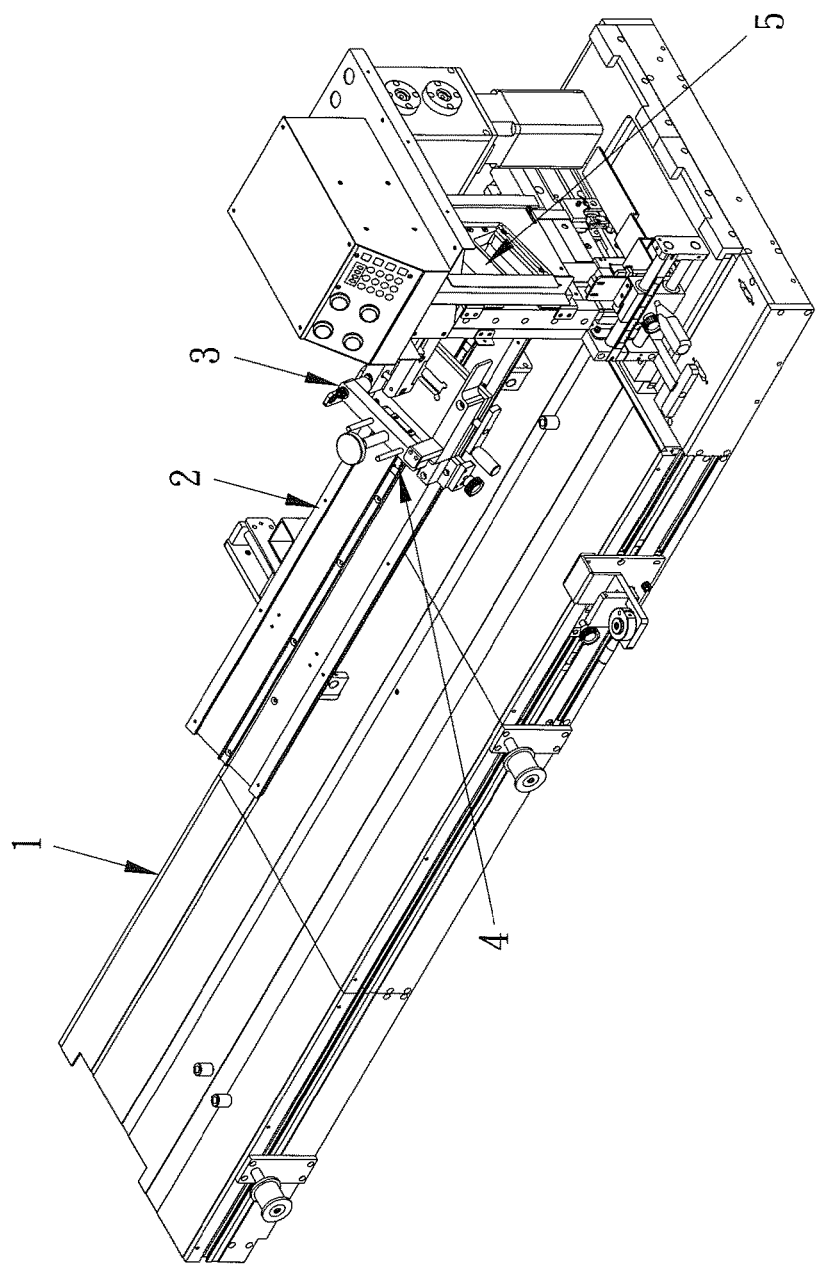
FIG. 1 is a perspective view showing the assembly of a measurement structure adapted for a curtain cutting machine according to a preferred embodiment of the present invention.
Figure 2:
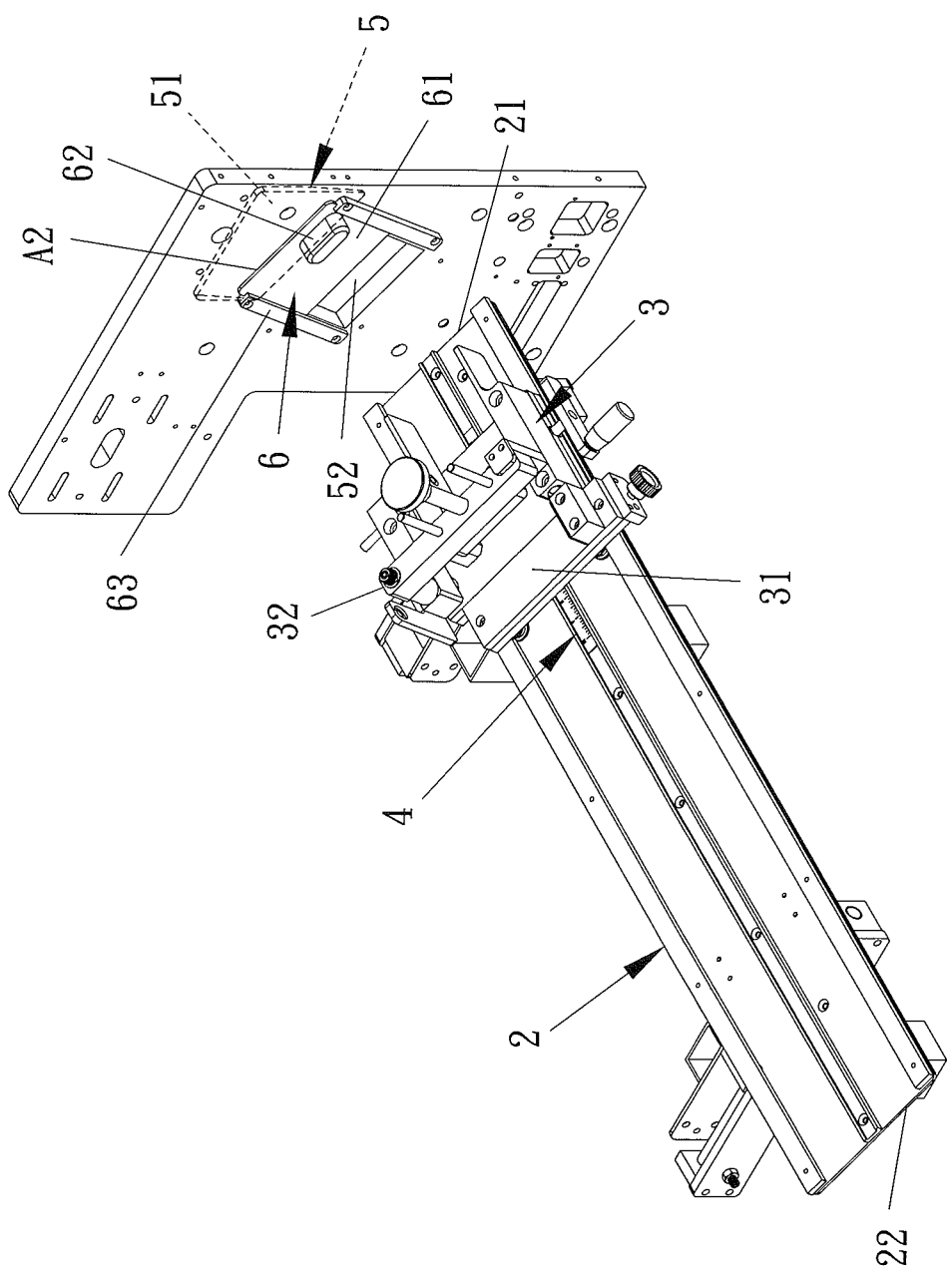
FIG. 2 is a perspective view showing the assembly of a part of the measurement structure adapted for the curtain cutting machine according to the preferred embodiment of the present invention.
Figure 3:
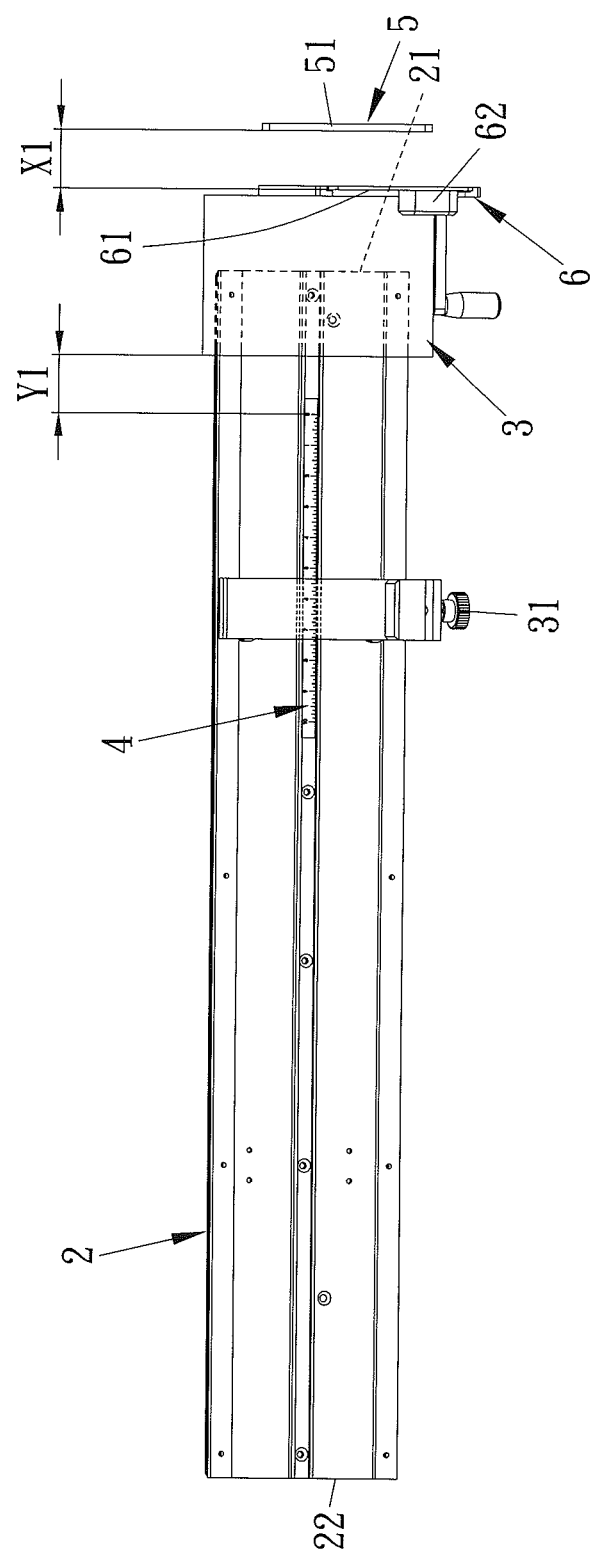
FIG. 3 is a side plane view showing the assembly of a part of the measurement structure adapted for the curtain cutting machine according to the preferred embodiment of the present invention.

With reference to FIGS. 1 to 3, a measurement structure according to a preferred embodiment of the present invention is adapted for a curtain cutting machine, and the curtain cutting machine comprises: a base 1 on which a track 2, a slidable seat 3, a scale set 4, a cutting device 5, and a covering door 6 are arranged. The track 2 includes a front segment 21 and a rear segment 22. The slidable seat 3 is disposed on and slides along the track 2, and the slidable seat 3 includes a positioning apparatus 31 mounted on one side thereof and configured to fix the slidable seat 3. The slidable seat 3 also includes a clamping apparatus 32 fixed thereon, and the scale set 4 is secured on the track 2 to indicate a position of the slidable seat 3. The cutting device 5 is located adjacent to the front segment 21 of the track 2 and includes a cutter 51 and an opening 52 configured to insert a curtain. The covering door 6 is mounted between the cutting device 5 and the track 2 and includes a stop face 61 facing to the track 2, and the stop face 61 has a grip portion 62 configured to be held and pulled by a user to move the covering door 6. The covering door 6 also includes two guiding rails 63, and each guiding rail 63 is arranged on each of two sides of the covering door 6. The two guiding rails 63 are applied to slide the covering door 6 to a first position A1 and a second position A2. When the covering door 6 slides to the first position A1, it stops the opening 52 of the cutting device 5, and when the covering door 6 slides to the second position A2, it opens the opening 52 of the cutting device 5.

Between the stop face 61 of the covering door 6 and the cutter 51 defines a spacing distance X1. When the slidable seat 3 slides toward a front-most position, between the slidable seat 3 and the scale set 4 defines a compensation distance Y1, and the compensation distance Y1 is equal to the spacing distance X1.

Figure 4:
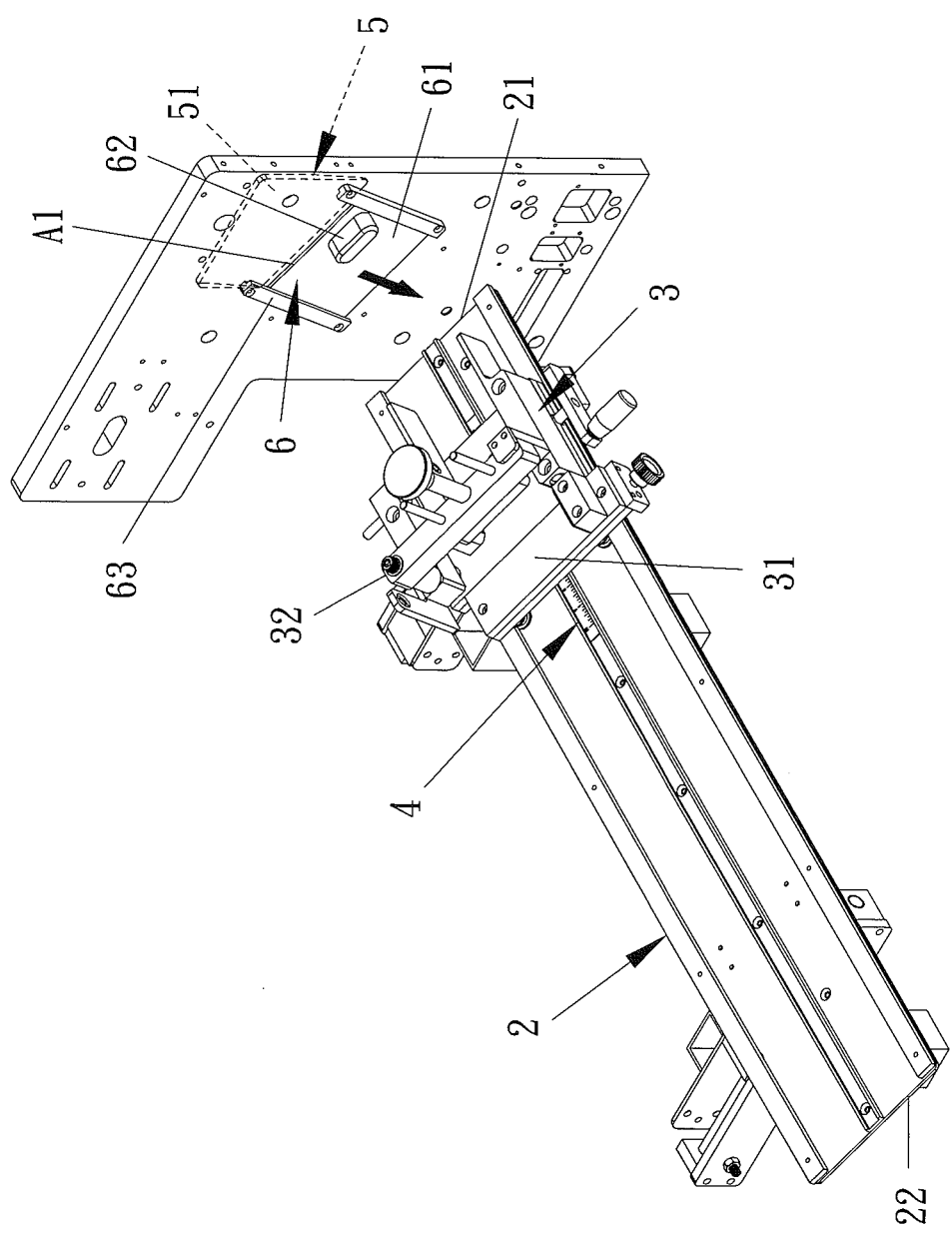
FIG. 4 is a perspective view showing a slidable seat sliding toward a predetermined position and a covering door moving to a first position to stop an opening of a cutting device according to the preferred embodiment of the present invention.
Figure 5:
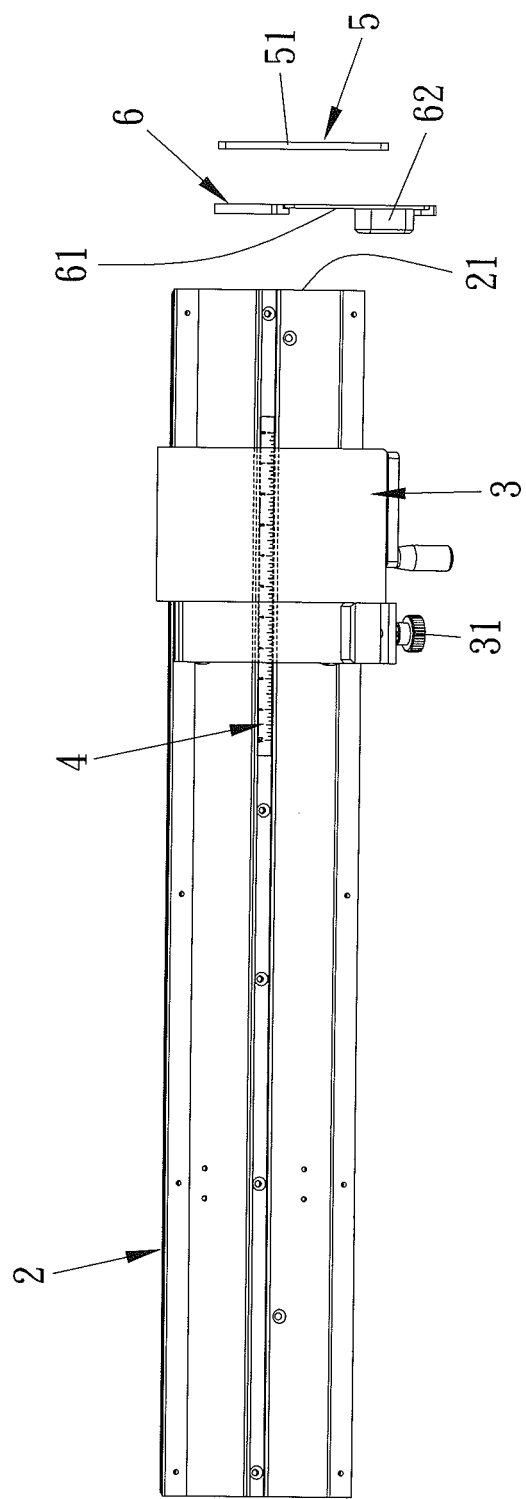
FIG. 5 is a side plane view showing the slidable seat sliding toward the predetermined position and the covering door moving to the first position to stop the opening of the cutting device according to the preferred embodiment of the present invention.
Figure 6:
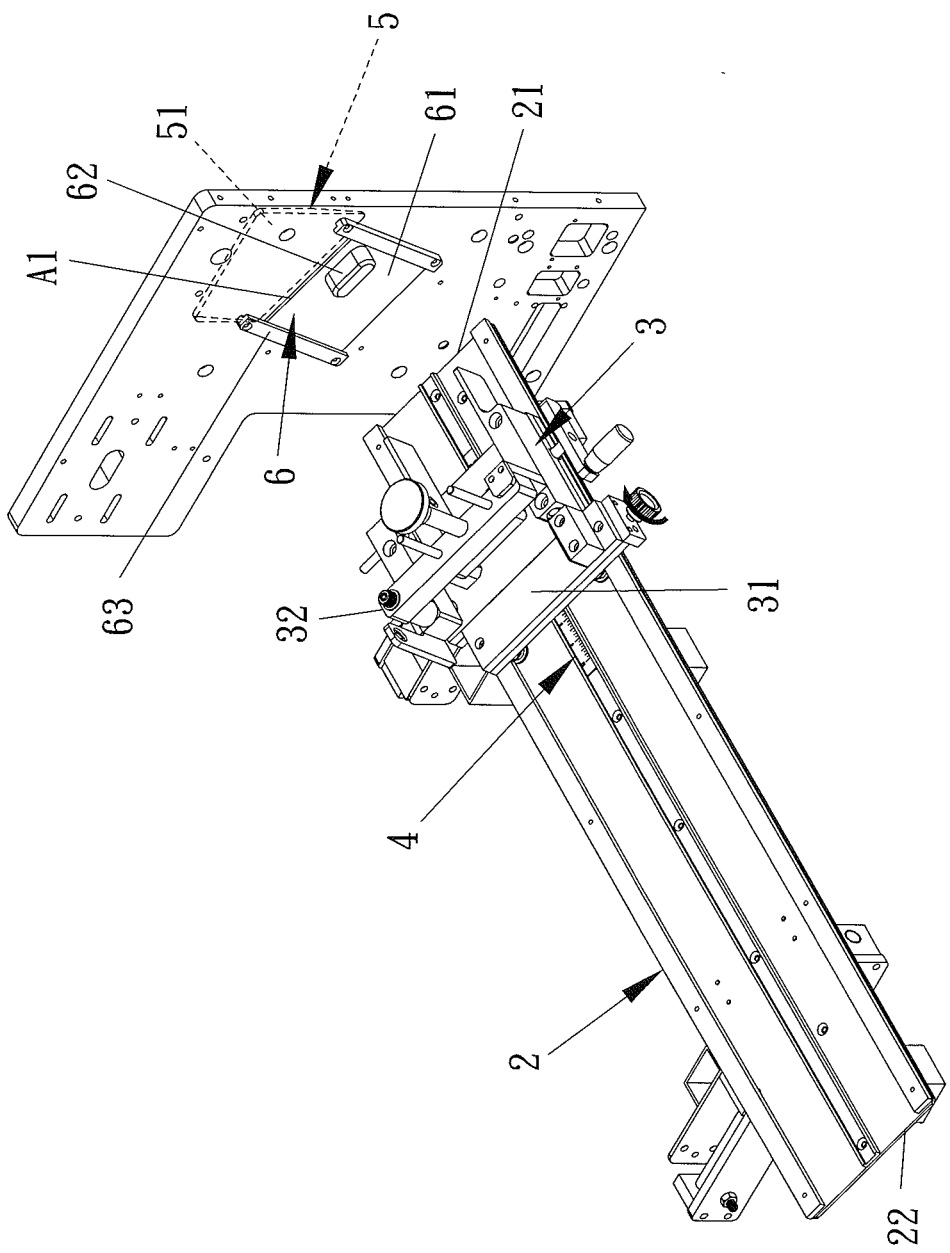
FIG. 6 is a perspective view showing the operation of a positioning apparatus of the measurement structure adapted for the curtain cutting machine according to the preferred embodiment of the present invention.
Figure 7:
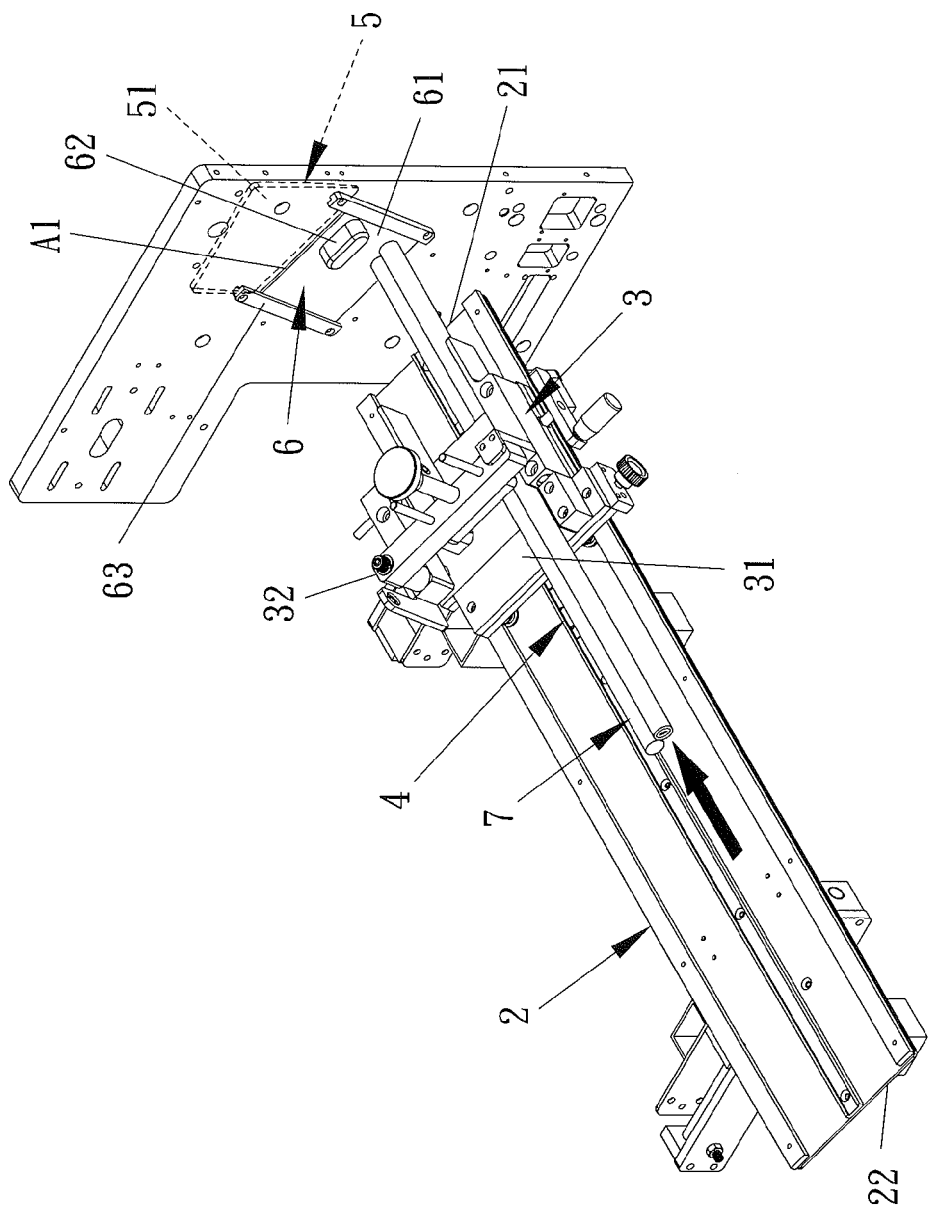
FIG. 7 is a perspective view showing a curtain being fixed according to the preferred embodiment of the present invention.
Figure 8:
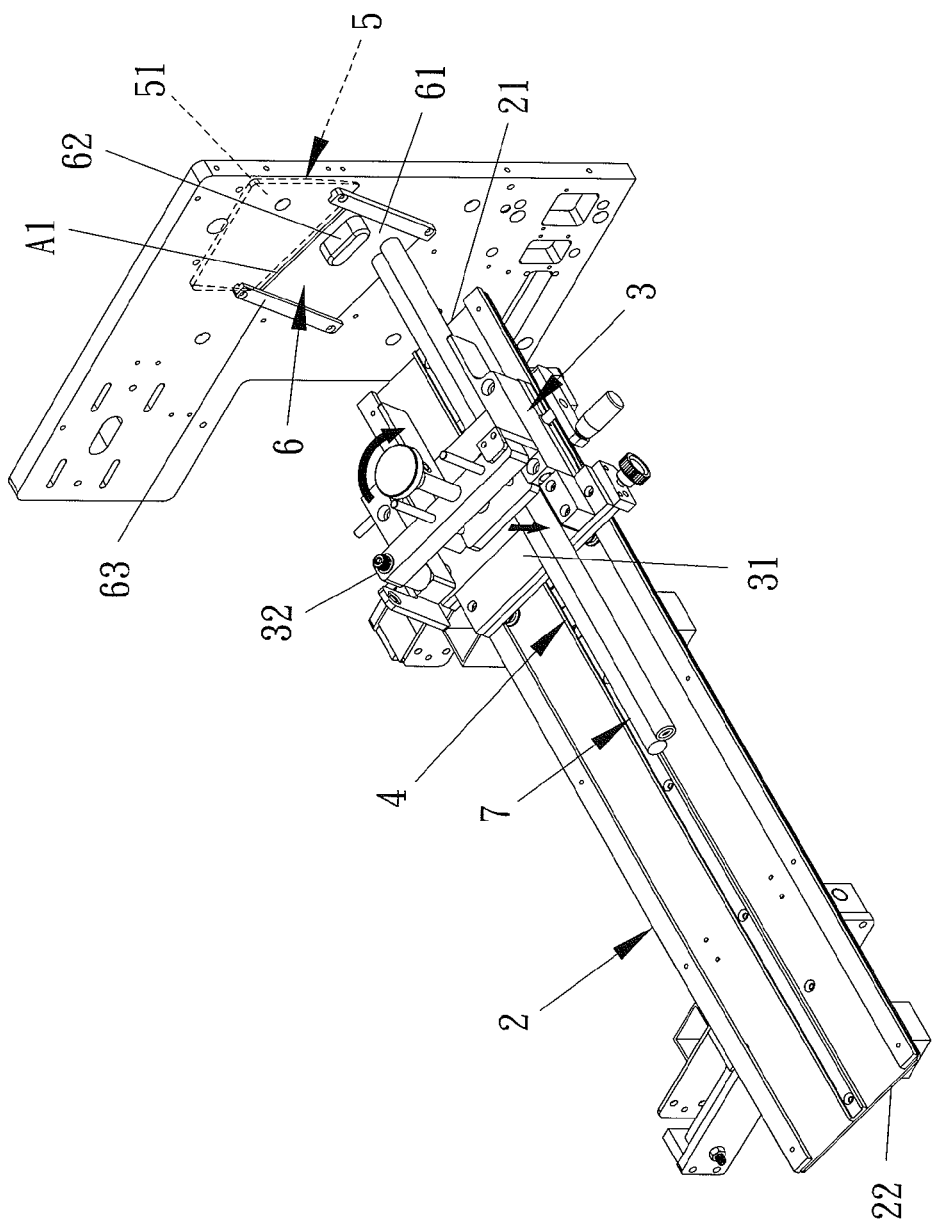
FIG. 8 is a perspective view showing the operation of a clamping apparatus of the measurement structure adapted for the curtain cutting machine according to the preferred embodiment of the present invention.
Figure 9:
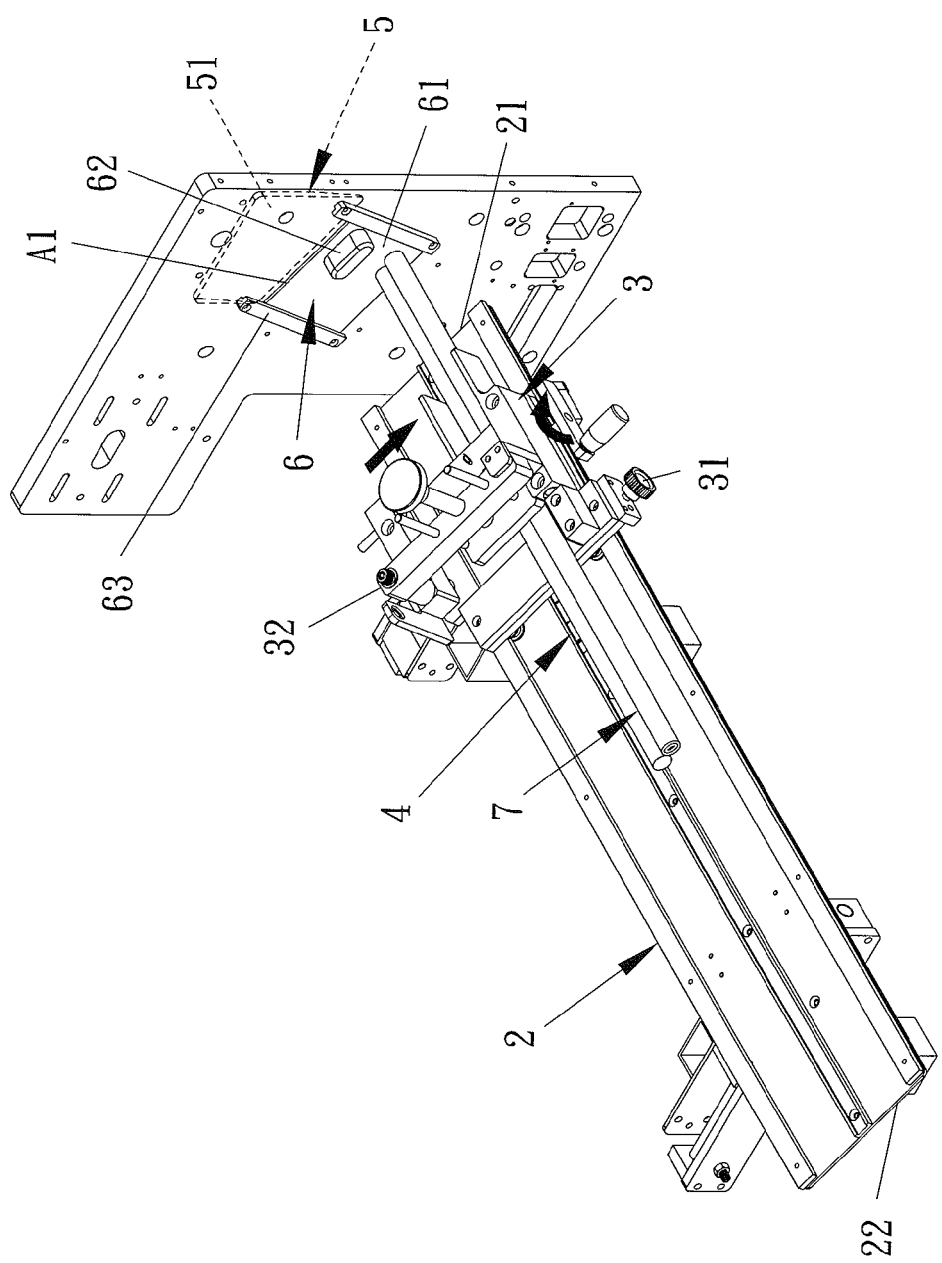
FIG. 9 is another perspective view showing the operation of the clamping apparatus of the measurement structure adapted for the curtain cutting machine according to the preferred embodiment of the present invention.
Figure 10:
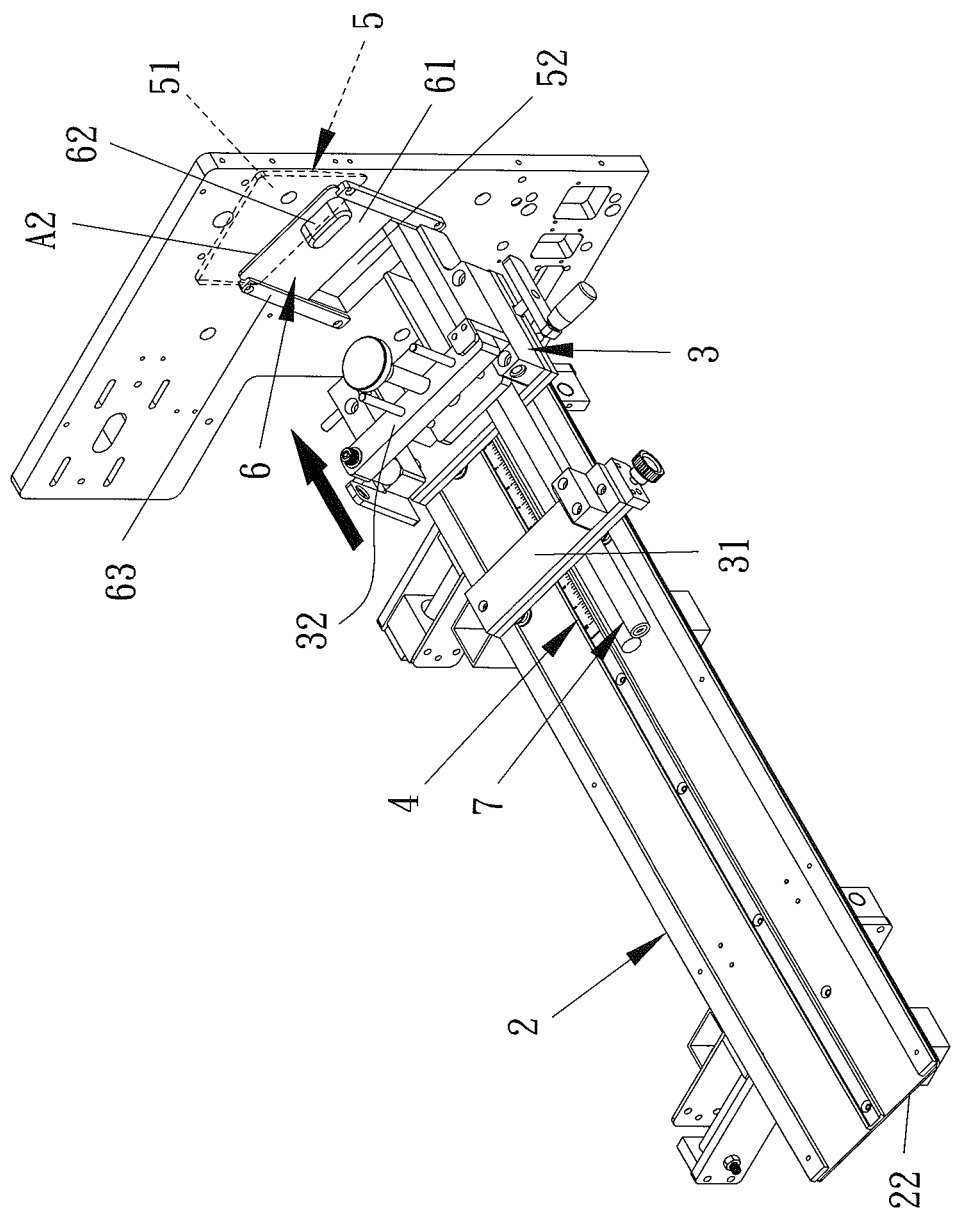
FIG. 10 is a perspective view showing the operation of the slidable seat of the measurement structure adapted for the curtain cutting machine according to the preferred embodiment of the present invention.
Figure 11:
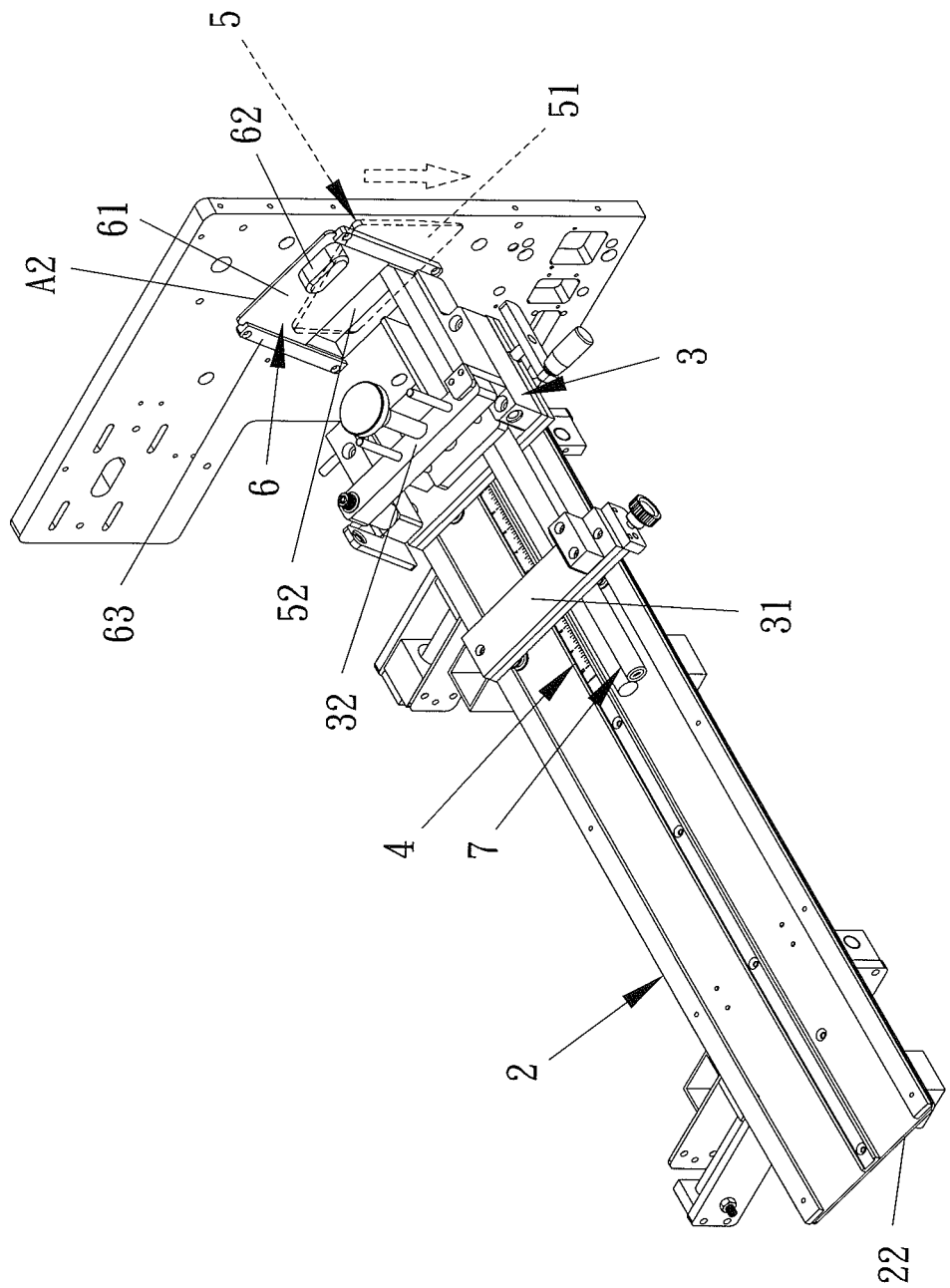
FIG. 11 is a perspective view showing the operation of the measurement structure adapted for the curtain cutting machine according to the preferred embodiment of the present invention.
Figure 12:
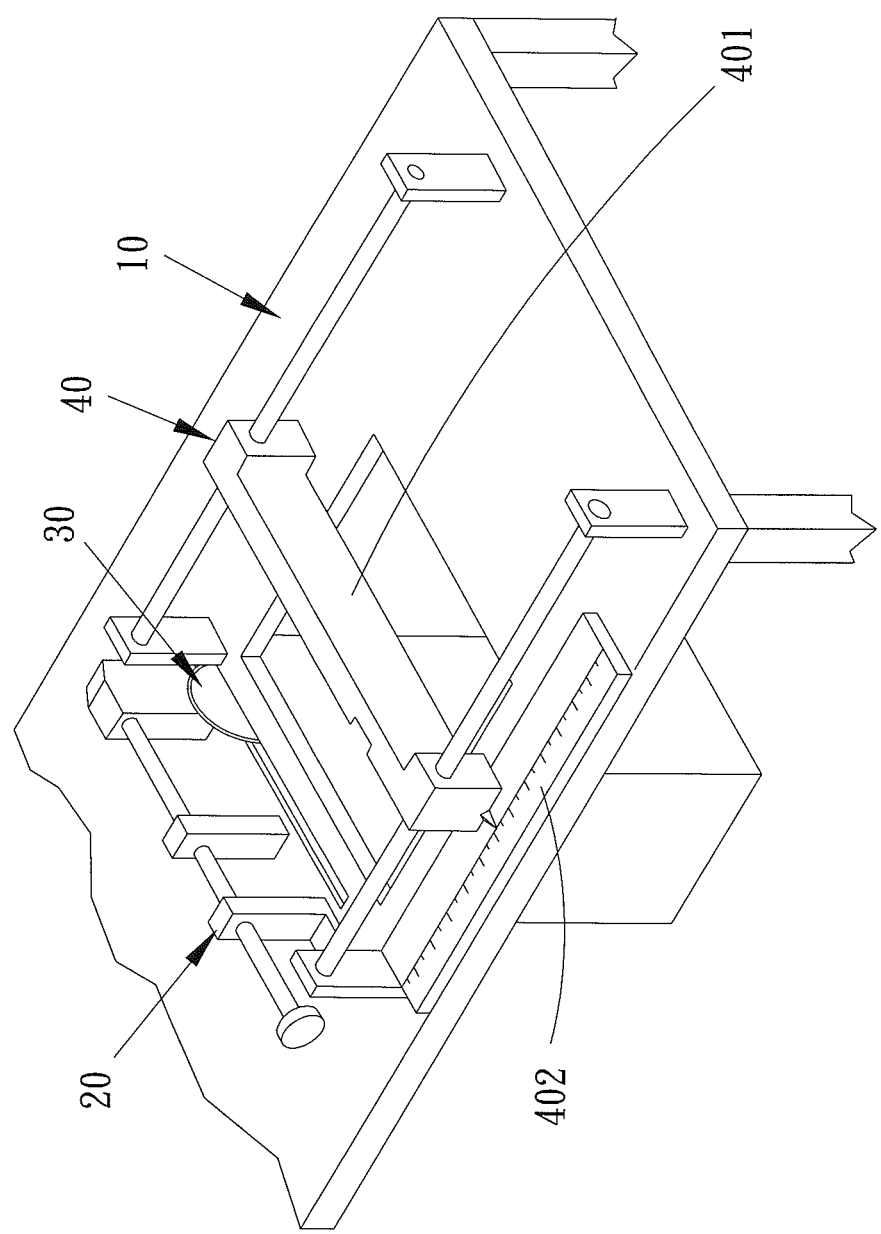
FIG. 12 is a perspective view showing the assembly of a part of a conventional curtain cutting machine.
Figure 13:
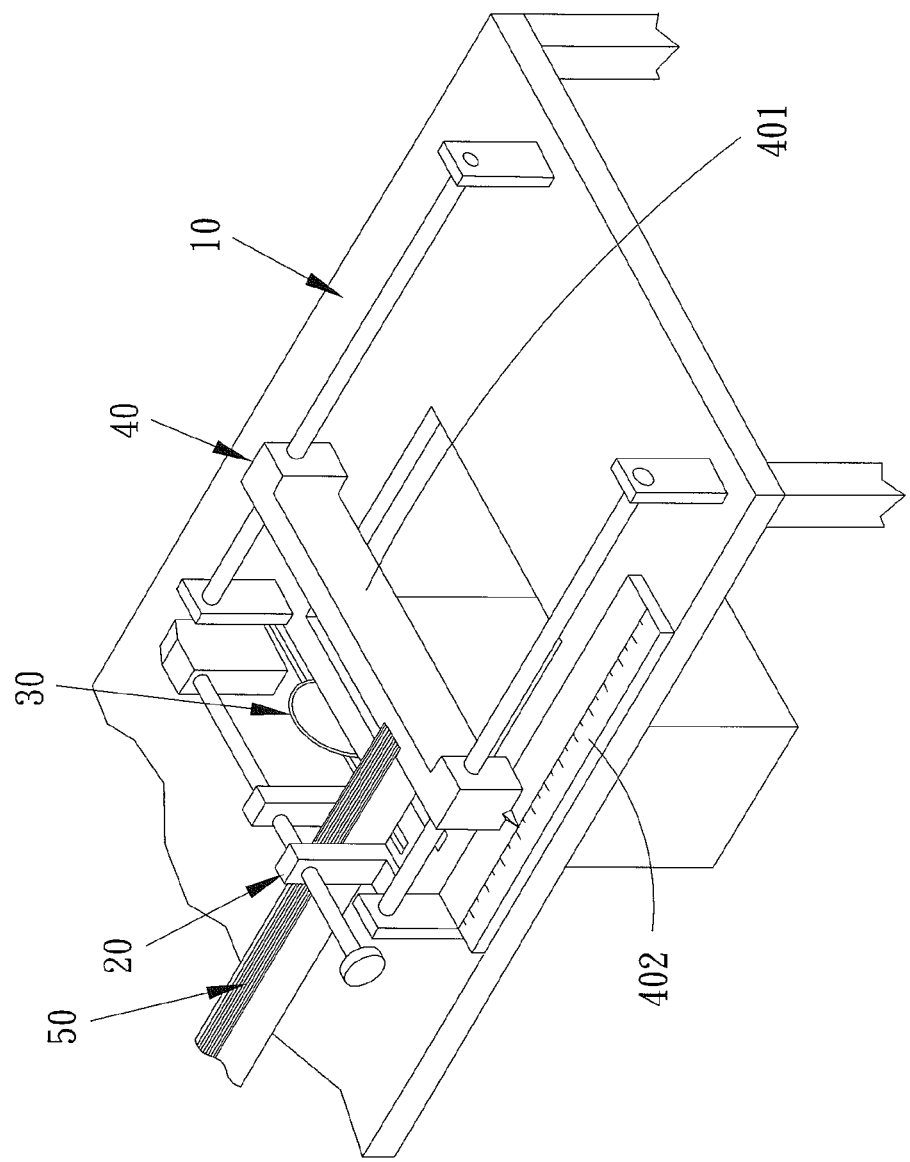
FIG. 13 is a perspective view showing the operation of the conventional curtain cutting machine.

When cutting the curtain, as shown in FIGS. 4 and 5, the slidable seat 3 slides toward a predetermined position based on a desired cutting length of the curtain 7 by collating with the scale set 4. For example, when desiring to cut the curtain 7 to 5.5 cm, the slidable seat 3 slides to an indication position of 5.5 cm on the scale set 4 by collating with the scale set 4. The covering door 6 is manually moved to the first position A1 to stop the opening 52 of the cutting device 5. As illustrated in FIG. 6, the positioning apparatus 31 is locked to cut the curtain of fixed size continuously, and the slidable seat 3 contacts with the positioning apparatus 31 and fixes quickly. Referring to FIGS. 7 and 9, the curtain 7 is rolled and placed on the track 2. One end of the curtain 7 is biased against the stop face 61 of the covering door 6. After the clamping apparatus 32 clamps the curtain 7. As illustrated in FIGS. 10 and 11, the covering door 6 is manually moved to the second position A2 to open the opening 52 of the cutting device 5, and the slidable seat 3 drives the curtain 7 to slide toward the front-most position along the track 2 so that the curtain 7 extends out of the opening 52 of the cutting device 5 in a predetermined length. Due to the compensation distance Y1 offsetting against the spacing distance X1 between the stop face 61 of the covering door 6 and the cutter 51, the curtain 7 extends out of the opening 52 of the cutting device 5 in the predetermined length. The predetermined length of the curtain 7 extending out of the opening 52 is identical to the desired cutting length of the curtain 7, so the curtain 7 is cut in the predetermined length by the cutter 51.

Furthermore, the covering door 6 is moved toward the first position A1 and the second position A2 in a pneumatic driving manner or an electric driving manner.

Accordingly, the measurement structure of the present invention contains advantages as follows:

1. The covering door 6 stops the opening 52, the scale set 4 measures a movement of the slidable seat 3, and the slidable seat 3 drives the curtain 7 to extend out of the opening 52 in the predetermined length. Thus, the curtain 7 is not interfered by the curtain cutting machine, and cut scraps of the curtain 7 drop smoothly, thus cutting the curtain 7 easily and quickly.

2. The covering door 6 stops or opens the opening 52, the slidable seat 3 slides along the track 2, and the scale set 4 measures the movement of the slidable seat 3. Thus, a size of the curtain cutting machine is small, thus fixing the curtain cutting machine in a limited space and using the curtain cutting machine conveniently.

While various embodiments in accordance with the present invention have been shown and described, it is clear to those skilled in the art that further embodiments may be made without departing from the scope of the present invention.

What is claimed is:

1. A measurement structure being adapted for a curtain cutting machine, with the curtain cutting machine comprising:
   a track including a front segment and a rear segment;
   a slidable seat disposed on and sliding along the track slideable in a slide direction between the first and rear segments, wherein the slideable seat includes a clamping apparatus configured to clamp a curtain extending in the slide direction;
   a scale set secured on the track to indicate a position of the slidable seat;
   a cutting device located spaced from the front segment of the track in the slide direction opposite to the rear segment, wherein the cutting device includes a cutter moveable perpendicular to the slide direction and configured to cut the curtain and an opening extending in a plane perpendicular to the slide direction and configured to allow passage of the curtain clamped by the clamping apparatus;
   a covering door movably mounted between the opening and the track in the slide direction and moving in a movement direction between a first position and a second position perpendicular to the slide direction, wherein the opening is intermediate the covering door and the cutter in the slide direction, with the cutter moveable parallel to the movement direction, wherein the covering door blocks the opening of the cutting device in the first position, wherein the covering door unblocks the opening of the cutting device in the second position allowing passage of the curtain clamped by the clamping apparatus through the opening in the slide direction;
   wherein when a curtain is placed on the track and one end is biased against the covering door, the slidable seat slides along the track and indicates the position by way of the scale set, the clamping apparatus clamps the curtain, the covering door is moved and the slidable seat drives the curtain to extend out of the opening of the cutting device in a predetermined length of the slide direction to cut the curtain with the cutter.

2. The measurement structure as claimed in claim 1, wherein the track, the slidable seat, the scale set, the cutting device, and the covering door are arranged on a base of the curtain cutting machine.

3. The measurement structure as claimed in claim 1, wherein the slidable seat also includes a positioning apparatus mounted thereon and configured to fix the slidable seat.

4. The measurement structure as claimed in claim 1, wherein the covering door includes a stop face facing the track and abutting against the curtain extending in the slide direction.

5. The measurement structure as claimed in claim 4, wherein between the stop face of the covering door and the cutter defines a spacing distance, and when the slidable seat slides toward a front-most position, between the slidable seat and the scale set defines a compensation distance, wherein the compensation distance is equal to the spacing distance.

6. The measurement structure as claimed in claim 1, further including two guiding rails, wherein the two guiding rails are arranged on two sides of the covering door and the opening, wherein the covering door slides in the movement direction to the first position and the second position between the two guiding rails.

7. The measurement structure as claimed in claim 6, wherein the cutting device includes a plate extending perpendicular to the slide direction, with the opening defined in the plate and extending in the plane perpendicular to the slide direction, and with the two guiding rails fixed to the plate intermediate the track and the plate.

8. The measurement structure as claimed in claim 7, wherein the covering door also includes a grip portion extending from the covering door in the slide direction away from the plate and configured to be held and pulled by a user to move the covering door between the first position and the second position, with the grip portion located intermediate the covering door and the slideable seat.

* * * * *